(12) United States Patent
Chung

(10) Patent No.: US 9,656,543 B2
(45) Date of Patent: May 23, 2017

(54) FUEL GAS TANK MANUFACTURING METHOD

(71) Applicant: Hyundai Motor Company, Seoul (KR)

(72) Inventor: Jae Han Chung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 82 days.

(21) Appl. No.: 14/612,447

(22) Filed: Feb. 3, 2015

(65) Prior Publication Data

US 2015/0274006 A1    Oct. 1, 2015

(30) Foreign Application Priority Data

Mar. 26, 2014   (KR) ........................ 10-2014-0035019

(51) Int. Cl.
*F17C 1/06* (2006.01)
*B60K 15/03* (2006.01)
(Continued)

(52) U.S. Cl.
CPC ........ *B60K 15/03006* (2013.01); *B29C 44/12* (2013.01); *B29C 70/86* (2013.01); *B29D 22/003* (2013.01); *F17C 1/06* (2013.01); *F17C 1/08* (2013.01); *F17C 1/16* (2013.01); *B29K 2075/00* (2013.01); *B29K 2105/04* (2013.01); *B29K 2105/258* (2013.01); *B29K 2705/00* (2013.01); *B60K 2015/03046* (2013.01); *B60K 2015/03059* (2013.01); *F17C 2201/0109* (2013.01); *F17C 2201/056* (2013.01); *F17C 2203/012* (2013.01); *F17C 2203/066* (2013.01);
(Continued)

(58) Field of Classification Search
CPC ........... Y10T 29/49801; Y10T 29/4998; Y10T 29/49879; Y10T 29/49869; Y10T 29/49968; Y10T 29/49982; B65D 2588/12; B60K 15/03006; B60K 2015/03046; B60K 2015/03032; B60K 2015/03039; B60K 2015/03493; F17C 1/06; F17C 2203/0665; F17C 2203/0663; F17C 2203/066; F17C 2203/013; F17C 2203/012; F17C 2203/011; F17C 1/08; F17C 2203/0658; F17C 1/02; F17C 1/04; F17C 2203/0614; F17C 2203/0617; F17C 2203/0619; F17C 2203/0634; B29C 45/14065; B29C 44/12
USPC ................ 220/590, 589, 588, 586; 264/46.7
See application file for complete search history.

(56) References Cited

U.S. PATENT DOCUMENTS 5,822,838 A * 10/1998 Seal ........................ B21D 51/24
156/172
6,425,172 B1 * 7/2002 Rutz ........................ B29C 70/56
156/162
(Continued)

FOREIGN PATENT DOCUMENTS

DE        4300484 C1 * 1/1994  ............... F16J 12/00
JP        62-251600        11/1987
(Continued)

*Primary Examiner* — Jermie Cozart
(74) *Attorney, Agent, or Firm* — Mintz Levin Cohn Ferris Glovsky and Popeo, P.C.; Peter F. Corless

(57) ABSTRACT

A tank for safely storing a fuel in a high-pressure gaseous state, and a method for manufacturing the tank are provided. The fuel gas storage tank includes a composite material that forms a tank shell and a liner disposed under the composite material. In addition, the liner has a structure in which a metal coil is integrally formed within the liner.

4 Claims, 6 Drawing Sheets

(51) Int. Cl.
*B29C 44/12* (2006.01)
*B29D 22/00* (2006.01)
*F17C 1/08* (2006.01)
*F17C 1/16* (2006.01)
*B29C 70/86* (2006.01)
*B29K 75/00* (2006.01)
*B29K 105/04* (2006.01)
*B29K 105/00* (2006.01)
*B29K 705/00* (2006.01)

(52) U.S. Cl.
CPC ............... *F17C 2203/0621* (2013.01); *F17C 2203/0663* (2013.01); *F17C 2203/0675* (2013.01); *F17C 2205/0397* (2013.01); *F17C 2209/2118* (2013.01); *F17C 2209/2181* (2013.01); *F17C 2209/234* (2013.01); *F17C 2221/012* (2013.01); *F17C 2221/033* (2013.01); *F17C 2223/0123* (2013.01); *F17C 2223/036* (2013.01); *F17C 2260/011* (2013.01); *F17C 2270/0168* (2013.01); *Y02E 60/321* (2013.01); *Y10T 29/4998* (2015.01); *Y10T 29/49801* (2015.01); *Y10T 29/49879* (2015.01); *Y10T 29/49968* (2015.01); *Y10T 29/49982* (2015.01)

(56) References Cited

U.S. PATENT DOCUMENTS

| | | | | |
|---|---|---|---|---|
| 6,716,503 | B1* | 4/2004 | Hauber | B29C 63/10 |
| | | | | 220/560.09 |
| 7,641,949 | B2* | 1/2010 | DeLay | B29C 53/602 |
| | | | | 220/586 |
| 2005/0087537 | A1* | 4/2005 | Kimbara | F17B 1/26 |
| | | | | 220/586 |

FOREIGN PATENT DOCUMENTS

| | | |
|---|---|---|
| JP | 2004-347042 A | 12/2004 |
| JP | 2005-003127 A | 1/2005 |
| JP | 2005-273724 A | 10/2005 |
| JP | 2006-275223 A | 10/2006 |
| JP | 2009-174700 A | 8/2009 |
| KR | 10-2013-0032186 | 4/2013 |
| KR | 10-2014-0016872 | 2/2014 |

\* cited by examiner (a) LINER (b) COMPOSITE MATERIAL LAYER

FUEL GAS TANK MANUFACTURING METHOD

CROSS-REFERENCE TO RELATED APPLICATION(S)

This application claims under 35 U.S.C. §119(a) the benefit of Korean Patent Application No. 10-2014-0035019 filed on Mar. 26, 2014, the entire contents of which are incorporated herein by reference.

BACKGROUND

Technical Field

The present disclosure relates to a fuel gas storage tank and a method of manufacturing the same and more particularly, to a tank that safely stores high-pressure gaseous phase fuel, and a method of manufacturing the same.

Background Art

In general, in alternative fuel gas vehicles, such as fuel cell vehicles and compressed natural gas vehicles, a configuration of a storage system differs based on the storage method of the fuel gas. Currently, the storage method of compressed gas has been a focus of vehicle manufacturers while considering cost, weight, and simplicity of the storage method. However, since gaseous phase fuel has a low energy storage density, the storage amount or the storage pressure may need to be increased to increase a travel distance of the vehicle. Since a gas storage system mounting space is limited within a vehicle, a size of the storage tank may also be limited so a higher-pressure gas may need to be stored safely.

For a composite tank of the fuel gas storage tank to withstand an internal pressure caused by the compressed gas, outer layers are reinforced with a fiber-reinforced composite material that has high specific strength and high specific stiffness, and a liner configured to maintain gas tightness is disposed under the composite layers. Further, the form of the fuel gas storage tank varies based on the material of the liner and is classified into a type with a liner made of metal, such as aluminum, and a type with a high-density polymer liner or the like. In particular, when the liner is made of metal, although the liner has relatively high safety properties, is the liner may be expensive and may have low fatigue resistant characteristics.

FIG. 5 shows a conventional fuel gas storage tank with a high density polymer liner, reference numeral 100 indicates a composite material, and reference numeral 110 indicates a polymer liner. When the liner is a high density polymer liner, the price is relatively inexpensive and the fatigue resistant characteristics are excellent, safety properties may not exist such as low permeability resistant of hydrogen (e.g., the polymer liner does not completely prevent hydrogen from permeating into the liner).

In particular, as shown in FIG. 5, the transmitted gas may remain at an interface between the polymer liner 110 and the composite material 100, and the gas may separate the composite material layer and the polymer liner layer when the tank pressure drops. Further, the gas may leak to the exterior of the tank through a flow path in the composite material. Furthermore, the transmitted gas, which has remained at the interface, may deform the polymer liner 110 in an inward direction and cause the polymer liner to buckle, as shown in FIG. 6.

The above information disclosed in this section is merely for enhancement of understanding of the background of the invention and therefore it may contain information that does not form the prior art that is already known in this country to a person of ordinary skill in the art.

SUMMARY

The present invention provides a fuel gas storage tank that may prevent a composite material from separating from a polymeric liner, and buckling of the polymeric liner caused by the pressure of the permeated fuel gas by using a fuel gas storage tank that has enhanced stiffness in a circumferential direction and a radial direction of the liner by being integrally formed with a metal coil during injection/extrusion molding of a polymer liner body portion, and a method of manufacturing the same.

Further, the present invention provides a fuel gas storage tank that may eliminate an explosion sound caused by an instant release of a gas, such as being able to temporarily store the permeated gas using a porous layer, such as a gas diffusion layer, between the composite material and the polymer liner, and a method of manufacturing the same and to move and release the permeated gas using air gas bubbles within the porous layer.

The fuel gas storage tank may include a composite material that forms a tank shell, and a liner disposed under the composite material, wherein the liner has a structure in which a metal coil is integrally formed within the liner, which may increase stiffness of the liner in the circumferential direction and the radial direction. According, the fuel gas storage tank may have increased the stiffness of the liner in the circumferential direction and the radial direction via a built-in metal coil integrated structure.

In particular, the metal coil formed integrally with the liner may be molded integrally or inserted when the liner is injection molding, and the metal coil molded integrally with the liner at that time may be formed on the liner body portion. Further, the fuel gas storage tank may further include a gas diffusion layer formed between the composite material and the liner to allow the gas to be released to the exterior while the gas diffuses and moves.

The method of manufacturing the fuel gas storage tank may include molding a metal coil integrated liner equipped with the metal coil using an injection or extrusion mold, and manufacturing a composite material on a metal coil integrated liner surface using a filament winding machine. The method may also include molding a gas diffusion layer by foam molding of the porous layer material on the metal coil integrated liner surface using a foam mold. Further, the molding of the metal coil integrated liner may include molding a metal coil integrated liner body portion equipped with the metal coil using the injection or extrusion mold, molding a metal boss integrated liner dome portion equipped with metal boss portions, and joining the liner body portion and the liner dome portion by fusing.

In addition, the method of manufacturing may include forming residual stress between the composite material and the liner using autofrettage. Furthermore, the manufacturing of a composite material on a metal coil integrated liner surface using a filament winding machine may include covering a portion of the boss portions at both ends of the liner when filament winding the composite material.

The fuel gas storage tank and the method of manufacturing the same provided by the present invention have the following effects.

1) Increased Stiffness of Liner

Trapping of fuel gas that passes through the liner and remains in the release space may be prevented, by removing a delamination (e.g., a part that separates) region between the liner and the composite material.

Buckling of the liner due to gas trapped in the release space between the liner and the composite material may be prevented by increasing the circumferential stiffness of the liner.

2) Discharge of the Transmitted Fuel Gas

The fuel gas transmitted through the walls of the liner may move to the boss portions at both ends of the tank through the pores in the gas diffusion layer and a flow path between the pores and may be released into the atmosphere (e.g., exterior of a storage tank) by forming the gas diffusion layer made of a porous layer material.

It may possible to prevent a phenomenon in which the transmitted gas that has remained in the release space between the liner and the composite material is instantly released to the boss portions, which may prevent an explosion sound, and the gas may be released onto the surface of the tank via the composite material flow path.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
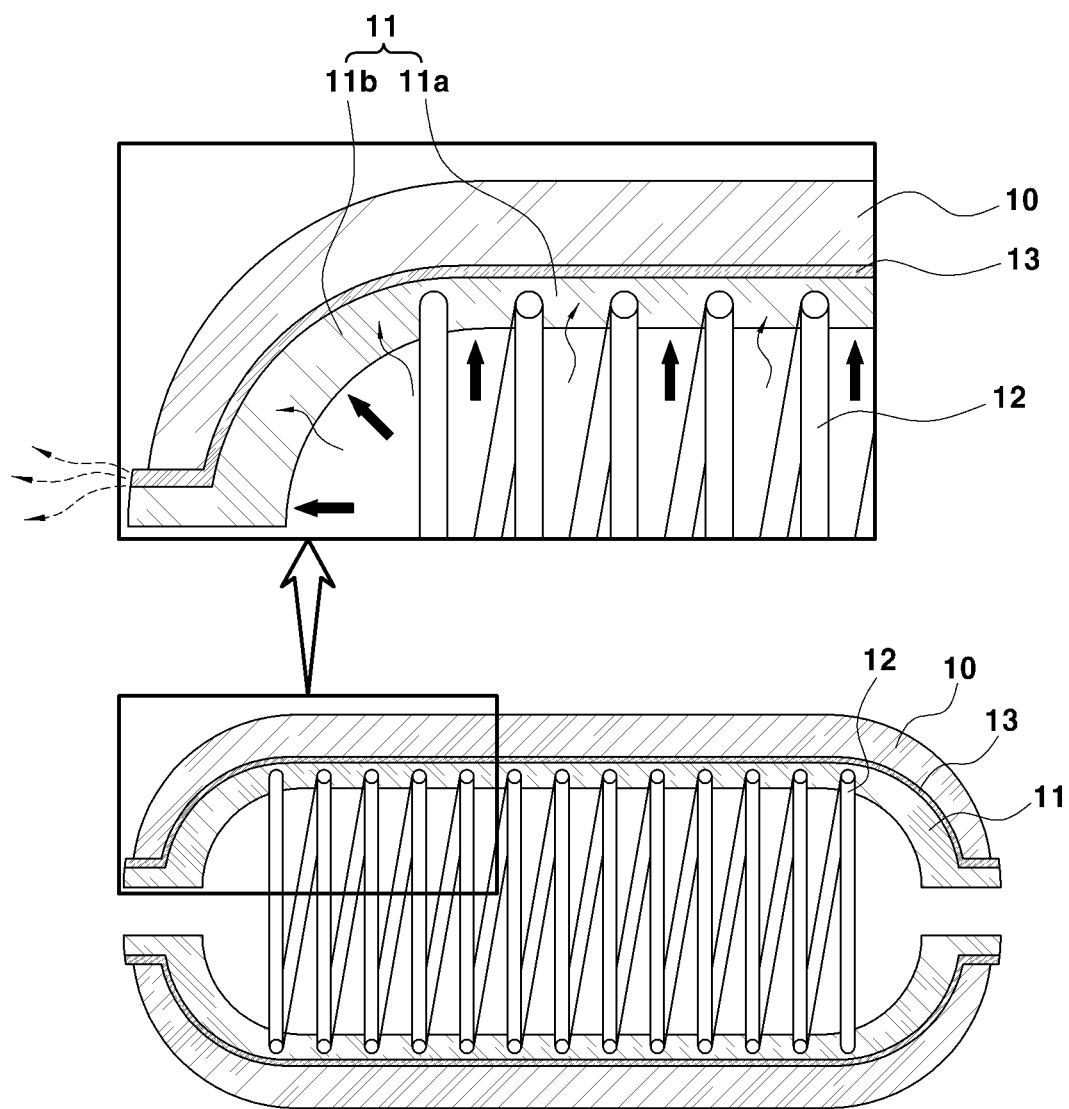
FIG. 1 is an exemplary cross-sectional view showing the fuel gas storage tank according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings.

FIG. 1 is an exemplary cross-sectional view showing a fuel gas storage tank according to an exemplary embodiment of the present invention. As shown in FIG. 1, the fuel gas storage tank may have a structure that may prevent delamination (e.g., separation) between the different material interfaces such as the form of the tube, by integrally equipping a coiled metal reinforcing member within the body portion of the polymer liner to enhance stiffness. Accordingly, the fuel gas storage tank may include a composite material 10 that forms a shell of a tank, and a polymeric liner 11 disposed under the composite material 10.

In particular, the composite material 10 and the liner 11 may be double-bonded to each other internally and externally to provide a space that may safely store a high-pressure fuel gas and form a tank shape. Metal coils 12 (e.g., metal coils 12 that have a coil spring form made of metal) may be formed within the liner 11 to enhance the circumferential and radial stiffness of the liner 11. The metal coils 12 may be made of various materials based on elongation and yield strength of the material, such as aluminum, and stainless steel.

The metal coils 12 may be inserted together and molded integrally during the injection molding of the liner 11, and the metal coils 12 integrally inserted and molded in this way may be completely disposed within the body portion without exposure to the exterior, while being concentrically disposed on a liner body portion 11a of the liner 11. In addition, when the liner 11 includes an integrated structure of the liner body portion 11a and the liner dome portion 11b, the liner body portion 11a and the liner dome portion 11B may form an integrated liner bonded to each other by melting after the injection or extrusion molding, respectively. In particular, since the metal coils 12 are integrally built within the liner 11, the circumferential and radial stiffness of the liner 11 may increase.

Meanwhile, a tube-like thin film metal may be manufactured in a stacked form by being inserted instead of the metal coils 12, but delamination between the polymer and the metal layer may occur due to a difference in permeability between the materials. However, when the metal coil 12 is applied according to an exemplary embodiment the present invention, transmitted hydrogen may move between the coils (e.g., between the polymer base materials) while increasing the stiffness. Accordingly, separation between the different material interfaces, such as shape of the tube, may not occur.

Further, a gas diffusion layer 13 may be formed at the interface between the composite material 10 and the liner 11. In particular, the gas diffusion layer 13 may operate to allow the gas that has passed through the liner 11 to be released to the exterior, while allowing the natural diffusion and movement. For example, when the gas diffusion layer 13 made of a porous layer material (e.g., polyurethane foam) is formed between the composite material 10 and the liner 11, the gas moving into the gas diffusion layer 13 (e.g., the gas passing through the liner 11) may be temporarily stored within the porous layer of the gas diffusion layer 13 and may be released to the exterior, while being diffused and moved through the pores of the porous layer.

Figure 2:
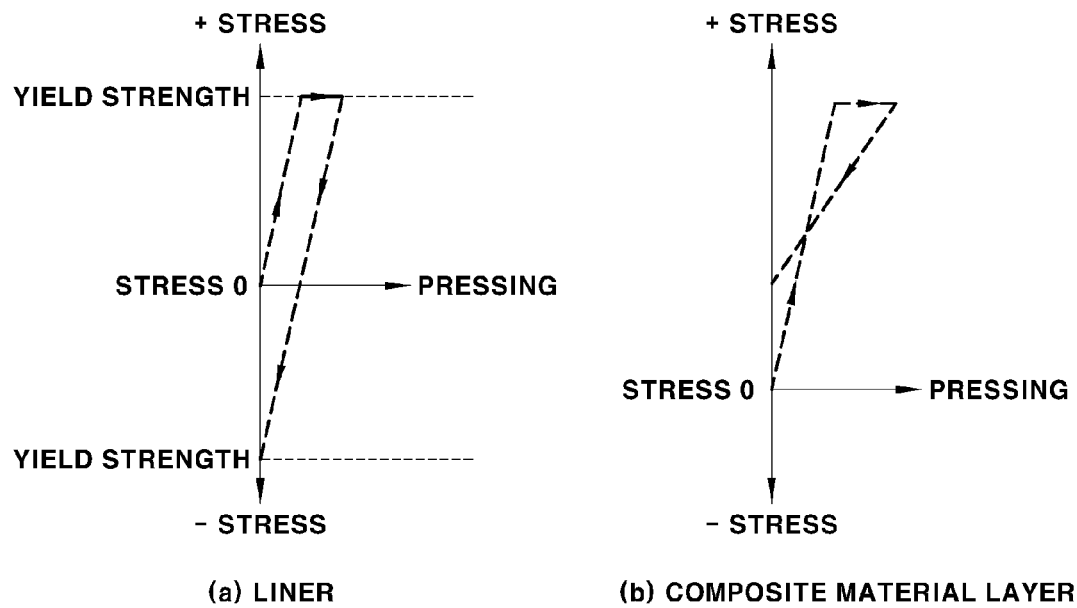
FIG. 2 is an exemplary schematic view showing a stress curve and a contact mechanism between the composite layer and the polymer liner with metal coil (e.g., a metal coil inserted into the polymer liner) of the fuel gas storage tank according to an exemplary embodiment of the present invention.
Figure 2:
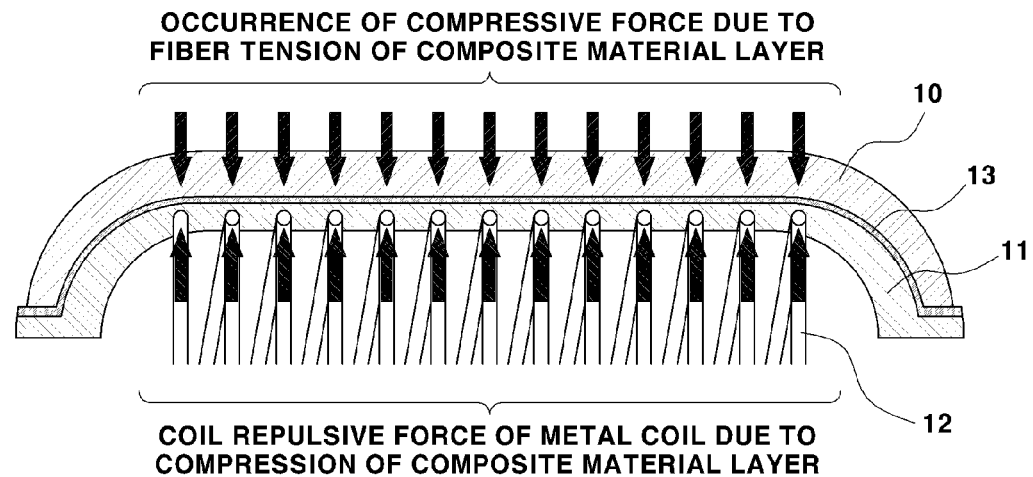

FIG. 2 is an exemplary schematic view showing a stress curve and a contact structure between the composite layer and the polymer liner within the fuel gas storage tank according to an exemplary embodiment of the present invention. As shown in FIG. 2, the metal coil 12 may be integrally formed in the body portion 11a of the polymer liner 11 during the injection/extrusion to enhance the circumferential and radial stiffness of the liner. When the surface of the liner 11 is reinforced with the composite material (e.g., filament winding), that is, after the liner 11 and the composite material 10 are formed on the inner and outer layers, the residual stress between the composite material 10 and the liner 11 may be generated through autofrettage. Accordingly, a tensile stress may be generated in the composite material 10, and a compressive stress may be generated in the liner 11, and since stress acting against each other acts on the two layers, a recess between the two layers may not be generated.

Furthermore, even when the metal coil 12 of the compressive stress state is stretched during charging, stress increases in the negative (−) state, maximum stress within the yield strength may be limited, and thus the durability may increase. The coil to be inserted at this time may be made of various metallic materials based on the elongation and the yield strength of the metallic material.

Figure 3:
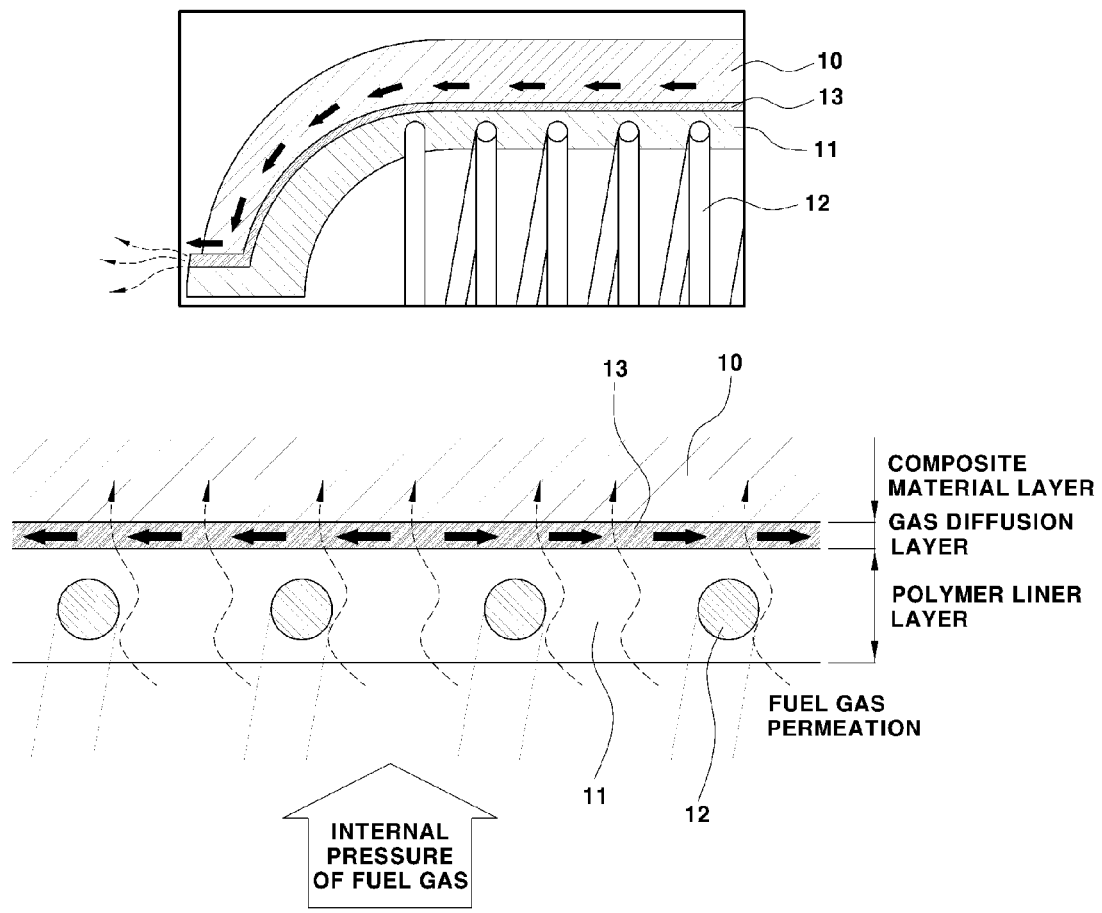
FIG. 3 is an exemplary cross-sectional view showing a permeation gas discharge state from the fuel gas storage tank according to an exemplary embodiment of the present invention.

FIG. 3 is an exemplary cross-sectional view showing the discharge state of the transmission gas from the fuel gas storage tank according to an exemplary embodiment of the present invention. As shown in FIG. 3, a layer structure of the fuel gas storage tank may include a polymer liner layer, a gas diffusion layer, and a composite material layer disposed from the inside to the exterior.

Fuel gas may permeate through the polymer liner layer and flow into the gas diffusion layer due to the internal pressure of the fuel gas, and the fuel gas temporarily accumulated in the gas diffusion layer in this manner may be released to the exterior by moving in a direction of both boss portions (e.g., in a direction of the boss of the liner dome portion), while being diffused by passing through bubbles within the porous layer of the gas diffusion layer. Since the fuel gas continuously released, an explosion sound from an instant release fuel gas may not be generated. Further, since the fuel gas is not released to the exterior of the tank along the composite material layer, a gas leak may as be prevented.

Figure 4:
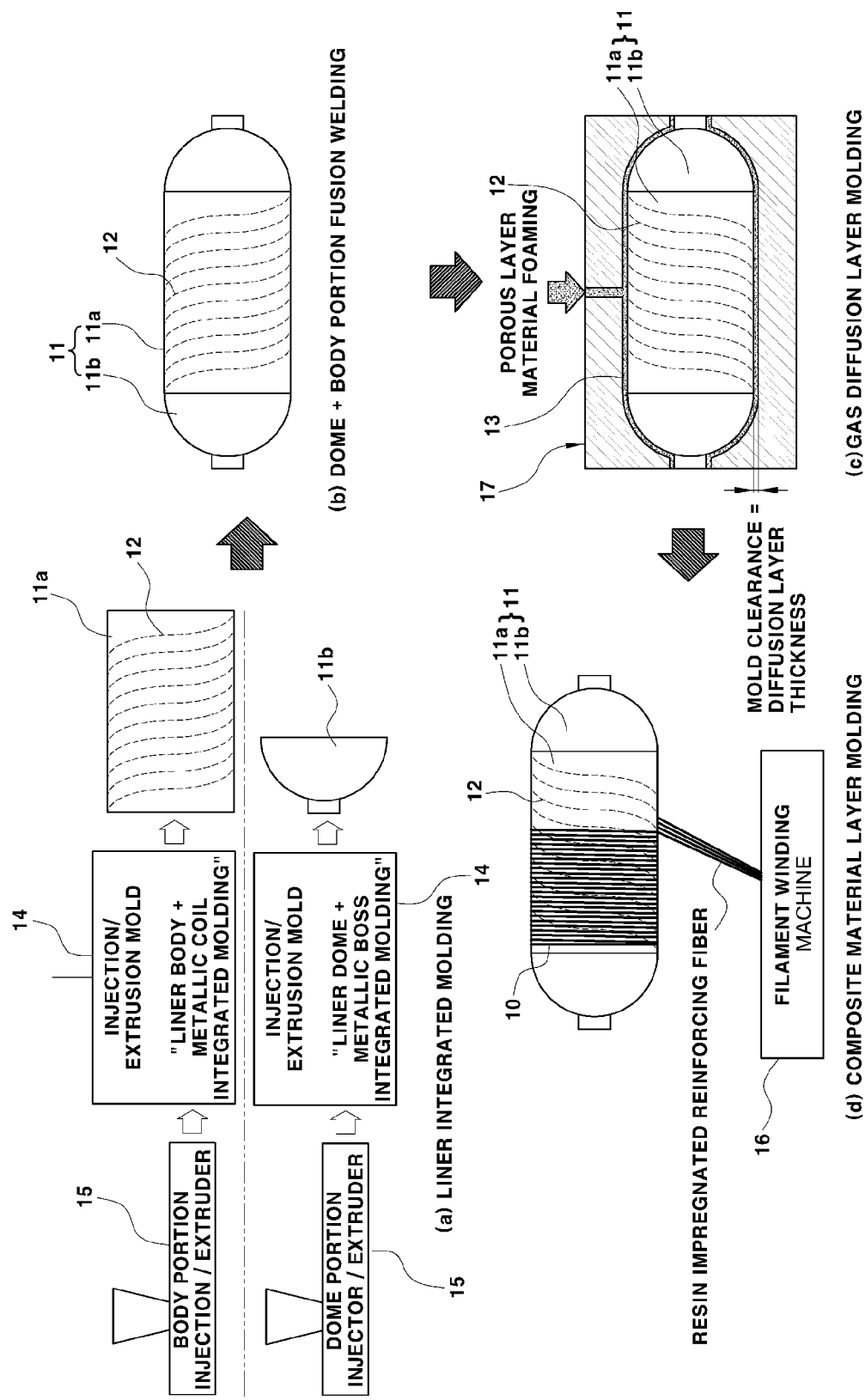
FIG. 4 is an exemplary schematic diagram illustrating a method for manufacturing the fuel gas storage tank according to an exemplary embodiment of the present invention.
Figure 5:
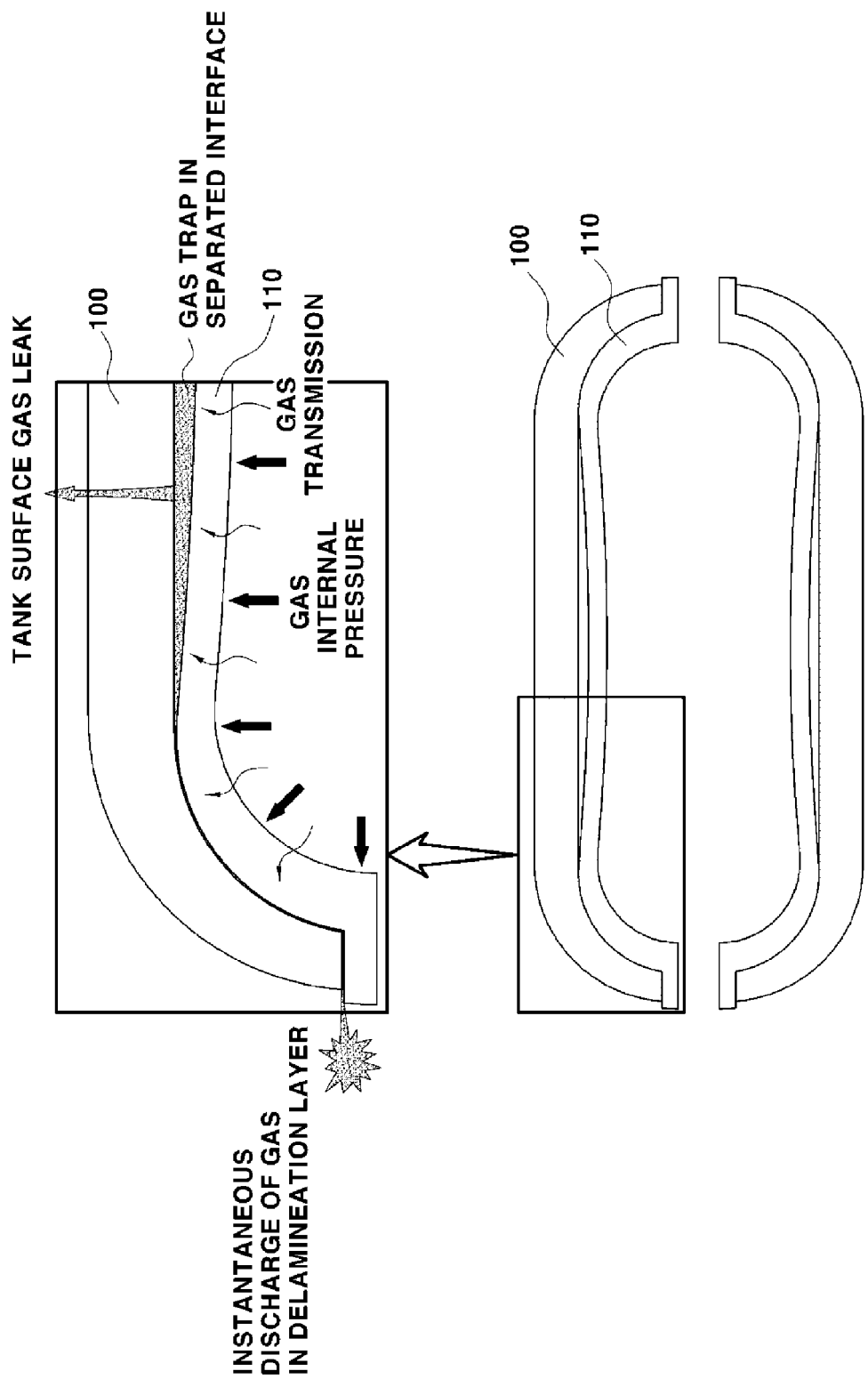
FIG. 5 is an exemplary cross-sectional view showing a fuel gas storage tank according to the related art.
Figure 6:
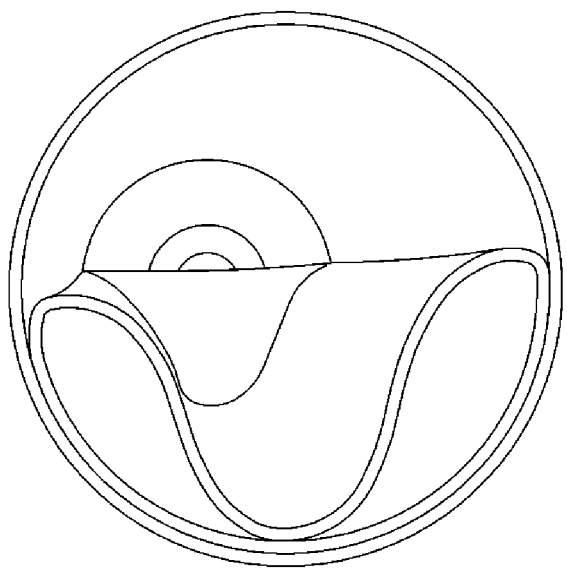
FIG. 6 is an exemplary illustration showing a buckling of the fuel gas storage tank according to the related art.

FIG. 4 is an exemplary schematic diagram illustrating a method for manufacturing the fuel gas storage tank according to an exemplary embodiment of the present invention. In particular, molding of the metal coil integrated liner 11 may apply an injection process or an extrusion process, molding of the gas diffusion layer 13 may apply a foaming process, molding of the composite material 10 may apply a filament winding process. Further, since an injection/extrusion mold 14, an injector/extruder 15, a foaming mold 17, a filament winding machine 16 and the like used for the injection method or the extrusion method, the foaming method, and the filament winding method have a general structure used for each process that is well known those skilled in the art, detailed descriptions thereof will be omitted.

A method of manufacturing a fuel storage tank may include molding the metal coil integrated liner metal 11 equipped with the metal coils 12 using the injection or extrusion mold 14 and the injector/extruder 15. In other words, the integrated liner 11 equipped with the metal coils 12 may be molded together with the metal coils 12 inserted into the mold when molding the liner 11.

The formation of the metal coil integrated liner may include molding the metal coil integrated liner body portion 11a equipped with the metal coils 12 using the injection or extrusion mold 14, molding the metal boss integrated liner dome portion 11b equipped with a metal boss (not shown) using the injection or extrusion mold 14, and joining the liner dome portion 11b to both end portions of the liner body portion 11a formed by fusing.

Further, the method may also include forming a gas diffusion layer 13 by foaming the porous layer material on the metal coil integrated liner surface using a foaming mold 17. In other words, the gas may be temporarily stored in the porous layer by applying the porous layer material onto the outer surface after molding the liner, and the gas may be diffused and moved through the pores of the porous layer, the material such as polyurethane foam may be foamed (e.g., formed into a foam like structure) by putting the liner into the form mold that has a space substantially similar to the thickness of the gas diffusion layer 13.

Since the gas diffusion layer may be compressed by tension of the filament winding when molding the composite material and the gas flow path may be blocked, stiffness may be reinforced by mixing the reinforcing member suitable for the porous layer material (e.g., a glass fiber) based on the winding tension. Further, boss portions at both ends of the liner may not be covered when filament winding. In other words, the gas diffusion layer may be completely formed up to the boss portions of both ends of the tank, and the moved transmission gas may be released, when resin by filament winding does not completely cover the boss portions of both sides when filament winding the composite material on the external surface of the gas diffusion layer.

The molding of the composite material on the metal coil integrated liner surface using the filament winding machine 16 may be executed. In other words, the composite material may be fabricated, by winding the resin-impregnated reinforcing fiber on an outer surface of the gas diffusion layer 13, using the filament winding machine 16. After the filament is wound to the composite material on the metal coil integrated liner surface, a residual stress between the composite material and the liner may be applied to the composite material and the liner by performing the autofrettage. Accordingly, the fuel gas storage tank may increase stiffness of the liner using the integrated metal coil, and may naturally discharge fuel gas through the liner outer surface diffusion layer.

For example, a hybrid liner may be obtained by mixing a metallic material and a polymer. In other words, a polymer may form a base material, and the metal coils may form a reinforcing material, and the fatigue-resistant properties of the liner may be supplemented by the polymer base material, and the stiffness of the polymer liner may be supplemented by the metal coils.

Furthermore, both layers have been joined to prevent delamination between the liner and the composite material, however problems, such as separation of the contacting layers, and more rapid dispersion of interface separation due to penetration of the fuel gas into the delaminated interface, were produced. Interfacial delamination may be prevented by integrally forming the metal coils with the liner and introducing the autofrettage.

Since the fuel gas may permeate through the polymer layer, substantial delamination between the different materials due to the gas may be prevented. Further, according to a polymer liner the interface between the polymer liner and the composite material may delaminate due to joining characteristics between the different materials, and the fuel gas that permeates into the direction of the thickness of the polymer liner may generate an explosion sound, when a fuel gas instantaneously leaks out to the tank boss portions after remaining in the delaminating space, or may be mistakenly interpreted as a gas leak between the composite material flow path.

To prevent this problem, the trap of the fuel gas may be prevented by attempting to join the composite material by applying an adhesive (e.g., bonding material) onto the surface of the liner, or the permeated fuel gas may be discharged to both boss sides along a generated flow path by locally inserting different materials between the liner and the composite layer to generate the flow path. However, the adhesive processing may cause the adhesive layer may break easily from fatigue caused by the charging and discharging. Further, forming the flow path may limit a number of flow paths, and a starting point for delamination may be more easily form during destruction of the flow path.

In the present invention, a gas diffusion layer between the liner and the composite material may allow permeated gas to be rapidly diffused through the pores of the diffusion layer, and diffused gas may escape to the boss portions at both ends of the tank. Since the permeated gas may not remain between the interfaces, but continuously escapes through the pores of the diffusion layer, the explosion sound may not occur, and since the gas may be discharged through the diffusion layer before escaping to the composite material flow rate, the gas may not leak to the surface of the tank, and the tank leak may be prevented from being mistaken. Accordingly, the delamination of layers and buckling may be prevented by increasing the stiffness of the liner, and the permeated fuel gas may move and discharge naturally by the gas diffusion layer to the exterior.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for manufacturing the fuel gas storage tank, comprising:
   molding a metal coil integrated liner equipped with a metal coil using an injection or extrusion mold;
   filament winding a composite material on a metal coil integrated liner surface using a filament winding apparatus; and
   molding a gas diffusion layer by performing foam molding of a porous layer material on the metal coil integrated liner surface using a foam mold.

2. The method of claim 1, wherein the molding of the metal coil integrated liner includes:
   molding a metal coil integrated liner body portion equipped with the metal coil using the injection or extrusion mold;
   molding a metal boss integrated liner dome portion equipped with metal boss portions; and
   joining the liner body portion and the liner dome portion by fusing.

3. The method of claim 1, further comprising:
   forming residual stress between the composite material and the liner using autofrettage.

4. The method of claim 1, wherein at the molding of the composite material on the metal coil integrated liner surface includes:
   covering a portion of boss portions at both ends of the liner when molding the composite material.

* * * * *